Patented Oct. 29, 1946

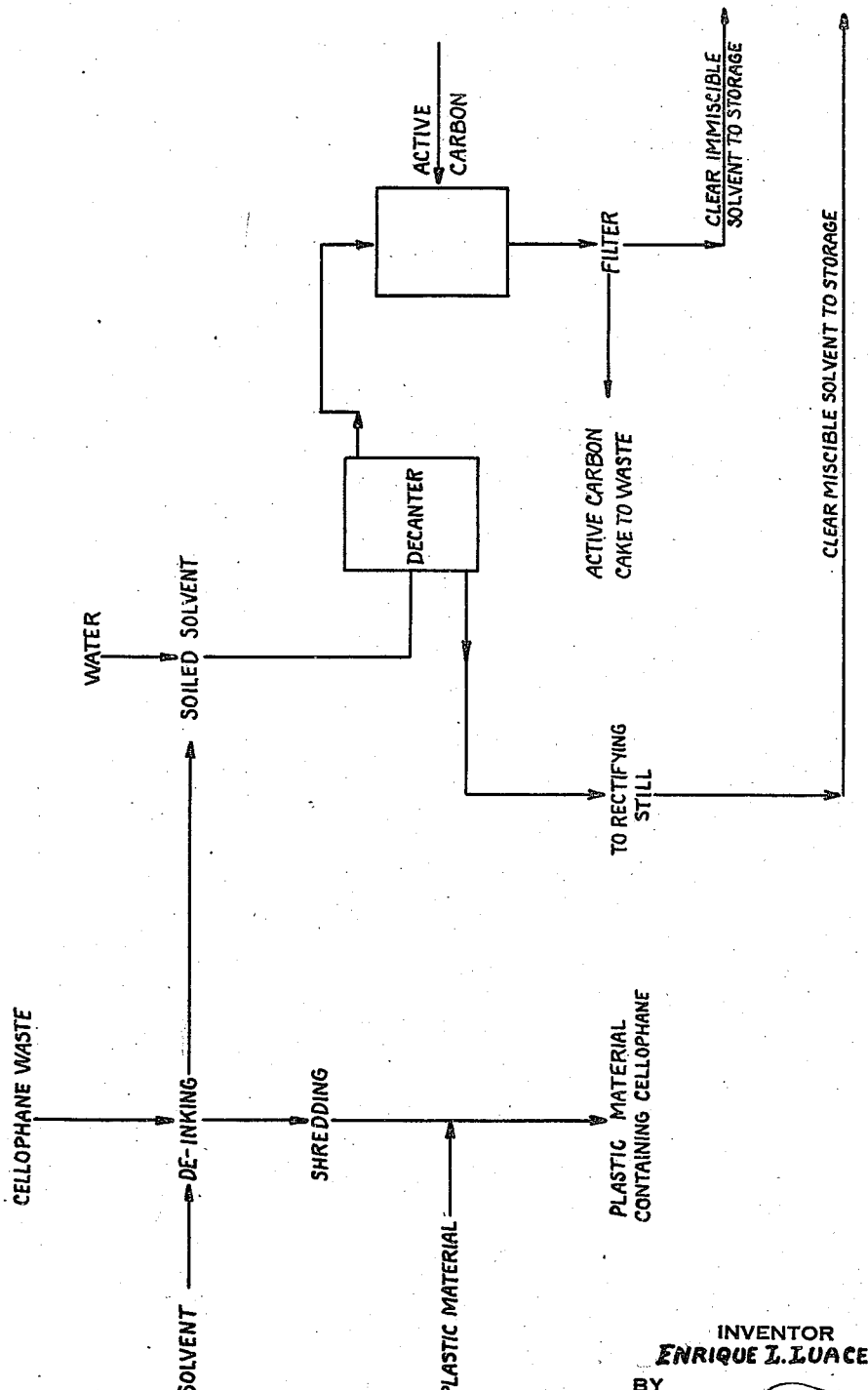

2,410,034

UNITED STATES PATENT OFFICE 2,410,034

METHOD OF RECLAIMING SOILED SOLVENT BY DISTILLATION AND ADSORPTION

Enrique L. Luàces, Dayton, Ohio, assignor to Chemical Developments Corporation, Dayton, Ohio, a corporation of Ohio Original application March 1, 1943, Serial No. 477,683. Divided and this application October 16, 1943, Serial No. 506,502

3 Claims. (Cl. 202—60)

This invention deals with a method of reclaiming soiled solvent, and this application is a division of application Serial No. 477,683, filed March 1, 1943.

In particular, this invention deals with a method of reclaiming solvents soiled with coloring matter and containing substantially 20 to 50% of hydrocarbons and the remainder consisting of ketones, esters and alcohols, any of the latter compounds alone or a mixture thereof. Such solvents, for example, are obtained in de-inking Cellophane waste material by extraction, as it is described in the above-mentioned parent application.

According to the instant invention, solvents of the described composition are reclaimed by adding water and purifying the aqueous fraction formed, after separation, by distillation and the non-aqueous fraction by adsorption with active carbon.

In the following, the method of my invention will be described in detail.

Most of the dyes or colors used in printing Cellophane are insoluble in water. The solvents used for de-inking may thus be reclaimed for further use by the following procedure:

A quantity of water equal to from 50 to 100% of the volume of the soiled solvent is added thereto and the mixture slowly agitated. The insoluble (hydrocarbon) portion of the solvent quickly separates from the water miscible (non-hydrocarbon) portion thereof. The ink colors are gathered into the supernatant layer of insoluble or immiscible solvent while the water added collects in the bottom layer. If severe agitation is avoided the separation of the two layers will be sharp and no emulsification will appear.

The top and bottom layers are separated. The former is mixed with a small quantity of active carbon (0.5 to 3% by weight) and after thorough agitation for approximately 10 to 20 minutes at room temperature may be separated from the carbon by filtration or otherwise perfectly clear and free of color. The bottom layer, in turn, is de-watered by distillation. All solvents are thus recovered for re-use with only slight handling losses.

It will be understood that while there have been described herein and illustrated in the drawing certain preferred embodiments of this invention, it is not intended thereby to have this invention limited to or circumscribed by the specific details herein described in view of the fact that the invention is susceptible to modifications depending on individual conditions and preference without departing from the spirit of this disclosure and the scope of the appended claims.

I claim:

1. The method of reclaiming soiled solvent containing water-insoluble coloring matter and said solvent consisting of 20 to 50% hydrocarbons and the balance being selected from the group consisting of ketones, esters, alcohols, and mixtures thereof, said method consisting in adding to the mixture of solvents a quantity of water whereby separation into two layers is brought about, the top layer containing the coloring matter and the bottom layer containing the added water, separating the top layer and the bottom layer, adding to the top layer active carbon, agitating the mixture of active carbon and top layer material, removing the active carbon therefrom to obtain top layer material free from coloring matter, and de-watering the bottom layer by distillation to obtain bottom layer material free from water.

2. The method of reclaiming solvent consisting of 25% benzol, 75% acetone and soiled by water-insoluble coloring matter, said method consisting in adding to the mixture of solvents a quantity of water whereby separation into two layers is brought about, the top layer containing the coloring matter and practically all of the benzol and the bottom layer containing the added water and practically all of the acetone, separating the top layer and the bottom layer, adding to the top layer active carbon, agitating the mixture of active carbon and top layer material, removing the active carbon therefrom to obtain benzol free from coloring matter, and de-watering the bottom layer by distillation to obtain water-free acetone.

3. The method of reclaiming soiled solvent containing water-insoluble coloring matter and said solvent consisting of 20 to 50% hydrocarbons and the balance being selected from the group consisting of ketones, esters, alcohols, and mixtures thereof, said method consisting in adding to the mixture of solvents a quantity of water whereby separation into two layers is brought about, the top layer containing the coloring matter and the bottom layer containing the added water, separating the top layer and the bottom layer, adding to the top layer from 0.5 to 3% by weight of active carbon, agitating the mixture of active carbon and top layer material, removing the active carbon therefrom to obtain top layer material free from coloring matter, and de-watering the bottom layer by distillation to obtain bottom layer material free from water.

ENRIQUE L. LUÀCES.